US007739275B2

(12) United States Patent
Dubinko et al.

(10) Patent No.: US 7,739,275 B2
(45) Date of Patent: Jun. 15, 2010

(54) SYSTEM AND METHOD FOR SELECTING OBJECT METADATA EVOLVING OVER TIME

(75) Inventors: Micah Joel Dubinko, Sunnyvale, CA (US); Shanmugasundaram Ravikumar, Cupertino, CA (US); Joseph Andrew Magnani, San Francisco, CA (US); Jasmine Novak, Mountain View, CA (US); Prabhakar Raghavan, Saratoga, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 680 days.

(21) Appl. No.: 11/437,425

(22) Filed: May 19, 2006

(65) Prior Publication Data

US 2007/0271270 A1      Nov. 22, 2007

(51) Int. Cl.
*G06F 17/30* (2006.01)
(52) U.S. Cl. .......................... 707/723; 707/725
(58) Field of Classification Search ................ 707/5, 707/104.1, 3, 7
See application file for complete search history.

(56) References Cited

U.S. PATENT DOCUMENTS

| | | | | |
|---|---|---|---|---|
| 6,526,440 B1 * | 2/2003 | Bharat | ......................... | 709/219 |
| 6,947,935 B1 * | 9/2005 | Horvitz et al. | ................ | 707/7 |
| 7,058,599 B2 * | 6/2006 | Hanks et al. | ................. | 705/27 |
| 7,149,729 B2 * | 12/2006 | Kaasten et al. | ................ | 707/1 |
| 7,162,473 B2 * | 1/2007 | Dumais et al. | ................ | 707/5 |
| 7,249,328 B1 * | 7/2007 | Davis | ........................ | 715/853 |
| 7,299,126 B2 * | 11/2007 | Gedik et al. | ................ | 701/207 |
| 7,404,150 B2 * | 7/2008 | Clark et al. | .................. | 715/810 |
| 7,418,403 B2 * | 8/2008 | Reid et al. | ..................... | 705/26 |
| 7,467,265 B1 * | 12/2008 | Tawri et al. | .................. | 711/161 |
| 7,584,181 B2 * | 9/2009 | Zeng et al. | ..................... | 707/5 |
| 2002/0194598 A1 * | 12/2002 | Connelly | ...................... | 725/39 |
| 2002/0194607 A1 * | 12/2002 | Connelly | ...................... | 725/87 |
| 2004/0078364 A1 * | 4/2004 | Ripley et al. | .................... | 707/3 |
| 2005/0193083 A1 * | 9/2005 | Han et al. | ..................... | 709/213 |
| 2005/0193414 A1 * | 9/2005 | Horvitz et al. | ................. | 725/46 |
| 2005/0278270 A1 * | 12/2005 | Carr et al. | ...................... | 706/25 |
| 2006/0271526 A1 * | 11/2006 | Charnock et al. | .............. | 707/3 |
| 2007/0094285 A1 * | 4/2007 | Agichtein et al. | ............ | 707/101 |
| 2007/0112732 A1 * | 5/2007 | Clark et al. | ..................... | 707/3 |
| 2007/0191110 A1 * | 8/2007 | Crouse | ........................ | 463/43 |
| 2007/0196007 A1 * | 8/2007 | Chen et al. | ................... | 382/131 |
| 2007/0232223 A1 * | 10/2007 | Bilange | ..................... | 455/3.06 |
| 2007/0248244 A1 * | 10/2007 | Sato et al. | ..................... | 382/103 |

* cited by examiner

*Primary Examiner*—Don Wong
*Assistant Examiner*—Thanh-Ha Dang
(74) *Attorney, Agent, or Firm*—Baker Botts L.L.P.

(57) ABSTRACT

An improved system and method for selecting and visualizing object metadata evolving over time is provided. An application may generate a visualization depicting the temporal evolution of metadata describing objects in an object store over a plurality of time intervals. The application may switch between a visualization of object metadata flowing like a river or cascading like a waterfall over time. A ranked list of metadata items may be determined for some pre-selected intervals during a pre-processing step. Then at runtime when a request may be received for providing a ranked list of metadata items for a query interval, a combination of time intervals from the pre-selected time intervals may be determined that cover the query time interval, and the ranked lists of metadata items for each time interval in the combination of time intervals that cover the query time interval may be aggregated and output for visualization.

20 Claims, 9 Drawing Sheets

SYSTEM AND METHOD FOR SELECTING OBJECT METADATA EVOLVING OVER TIME

CROSS-REFERENCE TO RELATED APPLICATIONS

The present invention is related to the following U.S. patent application, filed concurrently herewith and incorporated herein in its entirety: "System and Method for Visualizing the Temporal Evolution of Object Metadata," U.S. Pat. No. 7,581,184.

FIELD OF THE INVENTION

The invention relates generally to computer systems, and more particularly to an improved system and method for selecting and visualizing object metadata evolving over time.

BACKGROUND OF THE INVENTION

There is enormous and growing interest in the consumption of up-to-the moment streams of newly-published content of various forms: news articles, posts on blogs, or bulletin boards, and multimedia data such as images, songs or movie clips. Users often consume such data on an as-generated basis, using mechanisms like atom and Really Simple Syndication, or RSS, to be notified when interesting content becomes available. Moreover, social media applications like flickr.com provide an opportunity for communities of users to build structure on top of base content using tags and annotations. In flickr.com for example, users may upload and share photos, and may place tags on their own or others' photos. Such an online image sharing service may allow a user to append a tag to any photo in the system resulting in the addition of over a million tags each week to the collection of photos accessible through the service. For any of these applications, understanding the evolution of such numerous tags presents a challenging task.

In order to explore the evolution of community focus for social media applications, there is a need for being able to browse through users, photos, tags, or more complex structures such as groups, themes and clusters. Past techniques for visualizing this information have been functional but inadequate. Schneiderman's Treemaps have been applied to evolving time-series data and provide a visualization of hierarchies. For example, SmartMoney's map of the web-based visualization visible at <smartmoney.com/marketmap> shows multiple categories of time series data using a two-dimensional recursive partitioning of data points into boxes, and conveying volume and change in data using size and color. Unfortunately, this visualization focuses on a detailed breakdown of the data at each point in time without providing any framework for visualizing the evolution of the data over time. Other approaches such as Moodstats visible at <moodstats.com> show a static visualization of the evolution of mood over time, allowing detailed views into several dimensions of mood of an individual, and comparison to the snapshots of others. But the focus remains limited to providing a posthoc non-evolving view of an evolving dataset.

What is needed is a way to visualize the evolution of information built upon content more efficiently and that will apply at any timescale. Such a system and method should apply broadly to materializing and visualizing sequences of summarized data points along a time series for any type of content including audio, image, and video.

SUMMARY OF THE INVENTION

Briefly, the present invention may provide a system and method for selecting and visualizing object metadata evolving over time. In various embodiments, a client having a visualization engine may be operably coupled to a server for requesting object metadata from an object store. The visualization engine may generate a visualization in a user interface depicting the temporal evolution of metadata describing objects in the object store over a plurality of time intervals. The visualization engine may include an operably coupled river visualization engine for generating a visualization of object metadata flowing like a river over time, an operably coupled waterfall visualization engine for generating a visualization of object metadata cascading like a waterfall over time, and an animation engine for animating a visualization on a display.

The server may include an operably coupled server query handler for receiving and responding to requests for metadata describing objects in an object store during a query time interval. The server may also include an operably coupled ranking analysis engine for selecting and ordering metadata occurring during a time interval into a ranked list, an interval covering engine for determining a combination of time intervals from a set of pre-selected time intervals that cover a query time interval, and an aggregation engine for finding a ranked list of metadata for a query interval from the rankings for the set of pre-selected time intervals.

The present invention may efficiently summarize metadata belonging to large datasets and occurring over long timescales. To do so, a ranked list of some or all metadata items may be determined for some pre-selected intervals during a preprocessing step. Then at runtime when a request may be received for providing a ranked list of metadata items for a query interval, a combination of time intervals from the pre-selected time intervals may be determined that cover the query time interval, and the ranked lists of metadata items for each time interval in the combination of time intervals that cover the query time interval may be aggregated.

Advantageously, the present invention may flexibly summarize the temporal evolution of metadata describing content by switching between the river visualization and the waterfall visualization. A number of user controls are also provided for interacting with the visualization of the temporal evolution of object metadata, including randomly accessing a time interval, changing the speed of the animation, and selecting a metadata item for display of additional objects. Any types of content that may be described by metadata may be visualized, including text, audio, images, video, multimedia content, and so forth. Other advantages will become apparent from the following detailed description when taken in conjunction with the drawings, in which:

DETAILED DESCRIPTION

Exemplary Operating Environment

Figure 1:
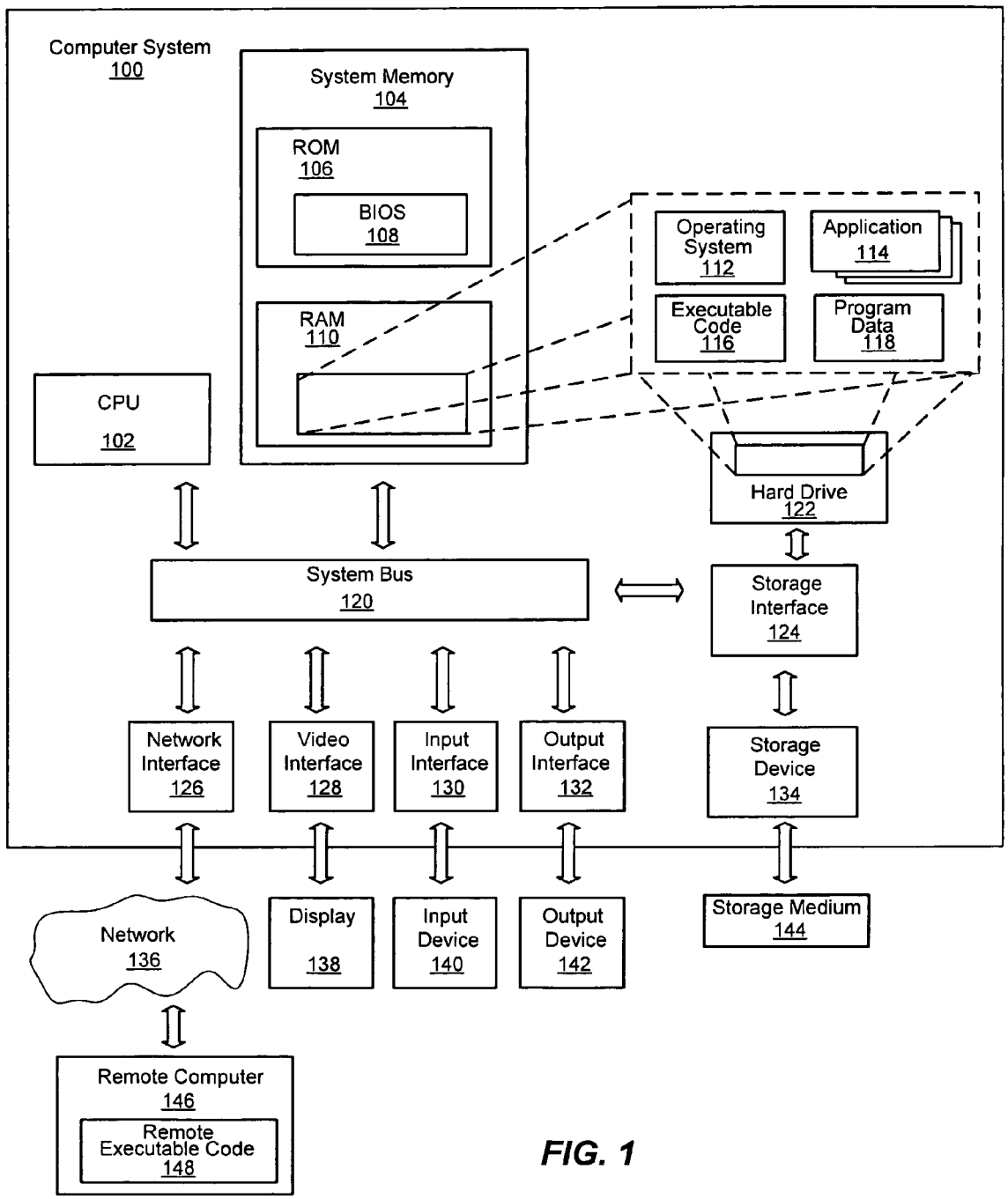
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Selecting and Visualizing Object Metadata Evolving Over Time

The present invention is generally directed towards a system and method for selecting and visualizing object metadata evolving over time. More particularly, the present invention may summarize metadata describing objects that may evolve over time and provide a visualization of their temporal evolution. As used herein, metadata means information that may describe any type of object including content such as text, audio, image, video, and multimedia content. Metadata may include one or more metadata items. A user may observe and interact with the visualizations as they present salient metadata associated with a sliding interval of time.

As will be seen, the techniques described may apply at any timescale while efficiently providing a view of temporal evolution for real-time applications. For example, a time series may look very different at the scale of a single day than at the scale of a week, a month, or a year. Information at the month or year level may show broader and more persistent patterns and shifts. As will be understood, the various block diagrams, flow charts and scenarios described herein are only examples, and there are many other scenarios to which the present invention will apply.

Figure 2:
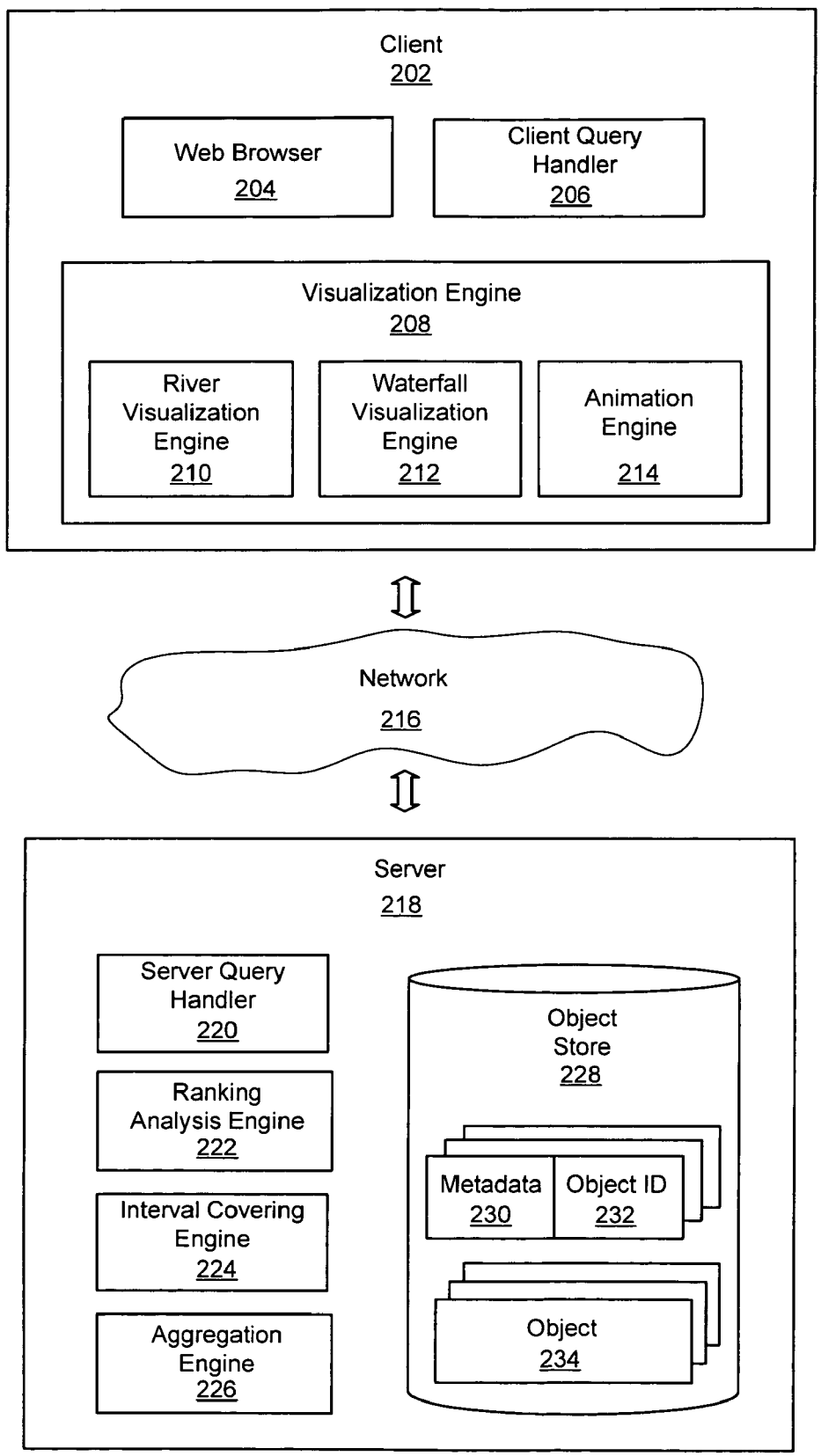
FIG. 2 is a block diagram generally representing an exemplary architecture of system components for selecting and visualizing object metadata evolving over time, in accordance with an aspect of the present invention.

Turning to FIG. 2 of the drawings, there is shown a block diagram generally representing an exemplary architecture of system components for selecting and visualizing object metadata evolving over time. Those skilled in the art will appreciate that the functionality implemented within the blocks illustrated in the diagram may be implemented as separate components or the functionality of several or all of the blocks may be implemented within a single component. For example, the functionality for the visualization engine 208 may be included in the same component as the web browser 204. Or the functionality of the animation engine 214 may be implemented as a separate component from the visualization engine 208. Moreover, those skilled in the art will appreciate that the functionality implemented within the blocks illustrated in the diagram may be executed on a single computer or distributed across a plurality of computers for execution.

In various embodiments, a client computer 202 may be operably coupled to one or more servers 218 by a network 216. The client computer 202 may be a computer such as computer system 100 of FIG. 1. The network 216 may be any type of network such as a local area network (LAN), a wide area network (WAN), or other type of network. A web browser 204 may execute on the client computer 202 and may include functionality for requesting visualization of the evolution of metadata describing objects in an object store. The web browser 204 may be operably coupled to a client query handler 206 and a visualization engine 208. The client query handler 206 may include functionality for receiving a request from the web browser for obtaining object metadata for a time period and for sending a request to a server to obtain object metadata from an object store. The visualization engine 208 may include functionality for animating visualizations depicting the evolution of object metadata over time. The visualization engine 208 may include a river visualization engine 210 for generating a visualization of object metadata flowing like a river over time, a waterfall visualization engine 212 for generating a visualization of object metadata cascading like a waterfall over time, and an animation engine 214 for animating the visualizations. In an embodiment, the animation engine may be provided by Flash in a web browser. In general, the web browser 204, the client query handler 206, the visualization engine 208, the river visualization engine 210, the waterfall visualization engine 212, and the animation engine 214 may be any type of interpreted or executable software code such as a kernel component, an application program, a script, a linked library, an object with methods, and so forth.

The server 218 may be any type of computer system or computing device such as computer system 100 of FIG. 1. The server 218 may provide services for accessing and storing metadata and the objects described by metadata. The server 218 may also provide services for indexing and selecting object metadata. The server 218 may include a server query handler 220 for receiving and responding to requests for metadata describing objects in an object store during a time period. The server 218 may include a ranking analysis engine 222 for selecting and ordering metadata occurring during a time period into a ranked list. The server 218 may also include an interval covering engine 224 for determining a combination of time intervals from a set of pre-selected time intervals that cover a query time interval. The server may additionally include an aggregation engine 226 for finding a ranked list of metadata for a query interval from the rankings for the set of pre-selected intervals. Each of these modules may also be any type of executable software code such as a kernel component, an application program, a linked library, an object with methods, or other type of executable software code.

The server 218 may be operably coupled to a database of objects such as object store 228 that may include any type of objects 234 that may be associated with metadata 230. In an embodiment, metadata 230 may be associated with an object ID 232 for one or more objects 234 that the metadata 230 may describe in the object store 228.

There are many applications which may use the present invention for selecting and visualizing object metadata evolving over time. Data mining, segmentation, business intelligence, online content publishing and social media applications are examples among these many applications. For any of these applications, new object metadata may be acquired daily and may be incorporated into a collection of object metadata previously acquired. For instance, a online photographic sharing application may allow users to upload and share photographs, and may also allow users to annotate the photographs with tags. Such an application may provide an opportunity for communities of users to build a structure of metadata on top of a base of content using tags and annotations. Those skilled in the art may recognize that other online applications such as news article feeds, blogs or bulletin boards, and multimedia data applications such as images, songs, or movie clips may similarly have metadata generated on top of the content. Such applications may use the present invention for selecting and visualizing object metadata evolving over time.

Figure 3:
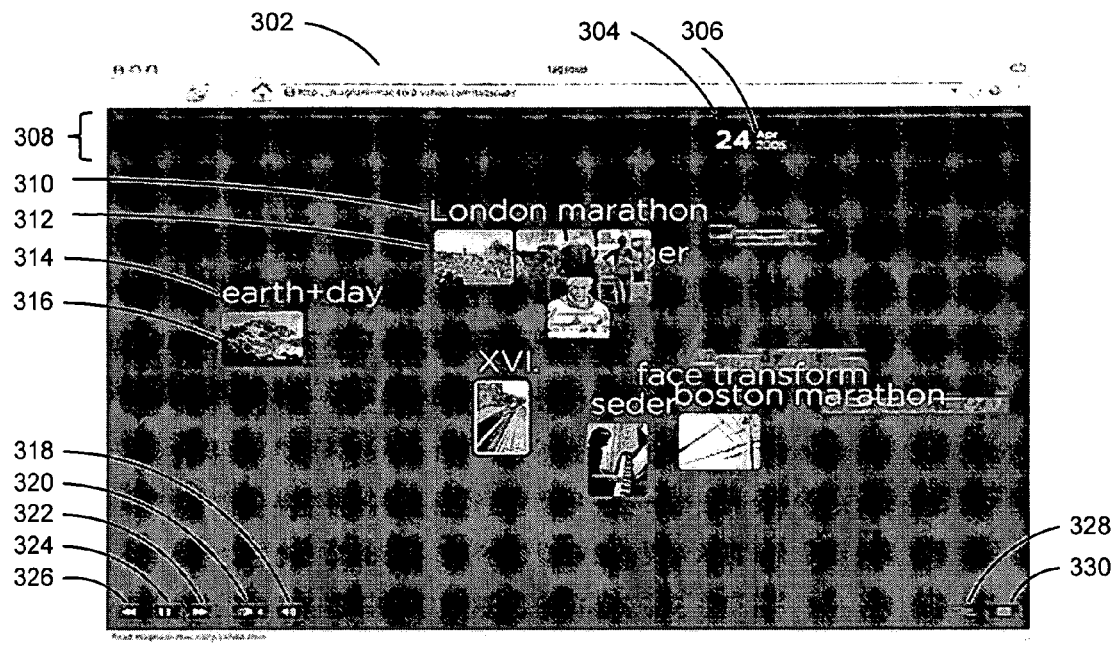
FIG. 3 is an illustration depicting in an embodiment a visualization of the evolution of object metadata flowing like a river over time, in accordance with an aspect of the present invention.

For example, FIG. 3 depicts in an embodiment a visualization of the evolution of object metadata flowing like a river over time. A screen of a web browser 302 may include a timescale bar 308 that may indicate the current interval of time 306 being summarized in the remainder of the screen where metadata items and associated objects may be displayed. In the embodiment illustrated in FIG. 3 for example, a time interval may be defined as a day such as the current time interval 306 indicated as Apr. 24, 2005. Those skilled in the art will appreciate that a time interval may be defined as a week, a month, or another period of time. A pointer 304 may be provided on the timescale bar 308 to support random access to time intervals within the timescale by dragging the pointer in either direction to a desired time interval.

FIG. 3 also illustrates metadata items with associated objects, in particular, tags describing photographs. For instance, metadata item 310 represents a tag, "London marathon," that describes several objects 312, photos related to the London marathon. Notice that the metadata item 310 with the associated objects 312 appear to be in a separate row of the display from other metadata items and associated objects such as metadata item 314 and associated object 316. The visualization depicted may be animated so that a metadata item and associated object(s) may initially appear in a random row on the left of the display and move across the display until they disappear off the right-hand side of the display. Like the flow of a river, popular metadata item for the time interval may thus be sequentially trickled onto the left-hand side of the screen and flow across the screen until disappearing off the right-hand side of the screen.

A user may choose to interact with the visualization. When a user may select a metadata item moving across the screen, the animation may pause and additional objects described by the metadata item may be displayed before the animation resumes. In the illustration of FIG. 3, the metadata item "London marathon" 310 was selected and more photographs related to the London marathon were displayed. In addition, the embodiment of FIG. 3 also illustrates various user controls for controlling the animation. For instance, there may be a forward control 322, a pause control 324, a reverse control 326, and a speed/slow control 320. There may also be an audio control 318. And there may be separate controls to seamlessly switch between the river visualization and the waterfall visualization using a river visualization control 328 or a waterfall visualization control 330.

Figure 4:
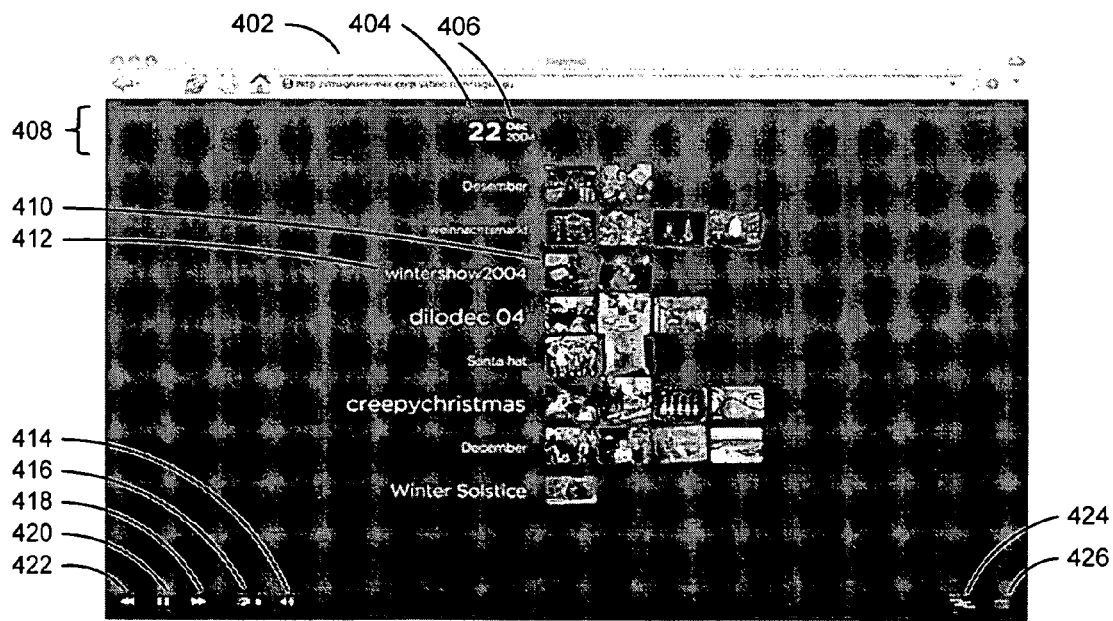
FIG. 4 is an illustration depicting in an embodiment a visualization of the evolution of object metadata cascading like a waterfall over time, in accordance with an aspect of the present invention.

FIG. 4 depicts in an embodiment a visualization of the evolution of metadata objects cascading like a waterfall over time. Similar to the embodiment of the river visualization of FIG. 3, FIG. 4 illustrates a screen of a web browser 402 that may include a timescale bar 408 that may indicate the current interval of time 406 being summarized in the remainder of the screen where metadata items and associated objects may be displayed. In the embodiment illustrated in FIG. 4 for example, a time interval may be defined as a day such as the current time interval 406 indicated as Dec. 22, 2004. Those skilled in the art will appreciate that a time interval may be defined as a week, a month, or another period of time. A pointer 404 may likewise be provided on the timescale bar 408 to support random access to time intervals within the timescale by dragging the pointer in either direction to a desired time interval.

FIG. 4 also illustrates metadata items with associated objects, namely tags describing photographs. For instance, metadata item 412 represents a tag, "wintershow 2004," that describes two objects 410, photos related to the 2004 wintershow. Notice that the metadata item 412 with the associated objects 410 appear to be in a separate row of the display from other metadata items and associated objects. For each new time interval being summarized, an additional object may be displayed for a metadata item that may persist from the previously summarized time interval. For instance, metadata item 412, "wintershow 2004," has two objects 412 displayed, namely two photographs. The first photograph may have been displayed during summarization of the previous time interval (Dec. 21, 2004) and the second photograph may be displayed during summarization of the current time interval 406 indicated as Dec. 22, 2004. Thus the visualization depicted may create a cascade of objects for metadata items persistent for successive time intervals and may be useful for understanding metadata persistence across successive time intervals.

In addition, the embodiment of FIG. 4 also illustrates various user controls for controlling the animation. For instance, there may be a forward control 422, a pause control 424, a reverse control 426, and a speed/slow control 420. There may also be an audio control 418. And there may be separate controls to seamlessly switch between the river visualization and the waterfall visualization using a river visualization control 428 or a waterfall visualization control 430.

Figure 5:
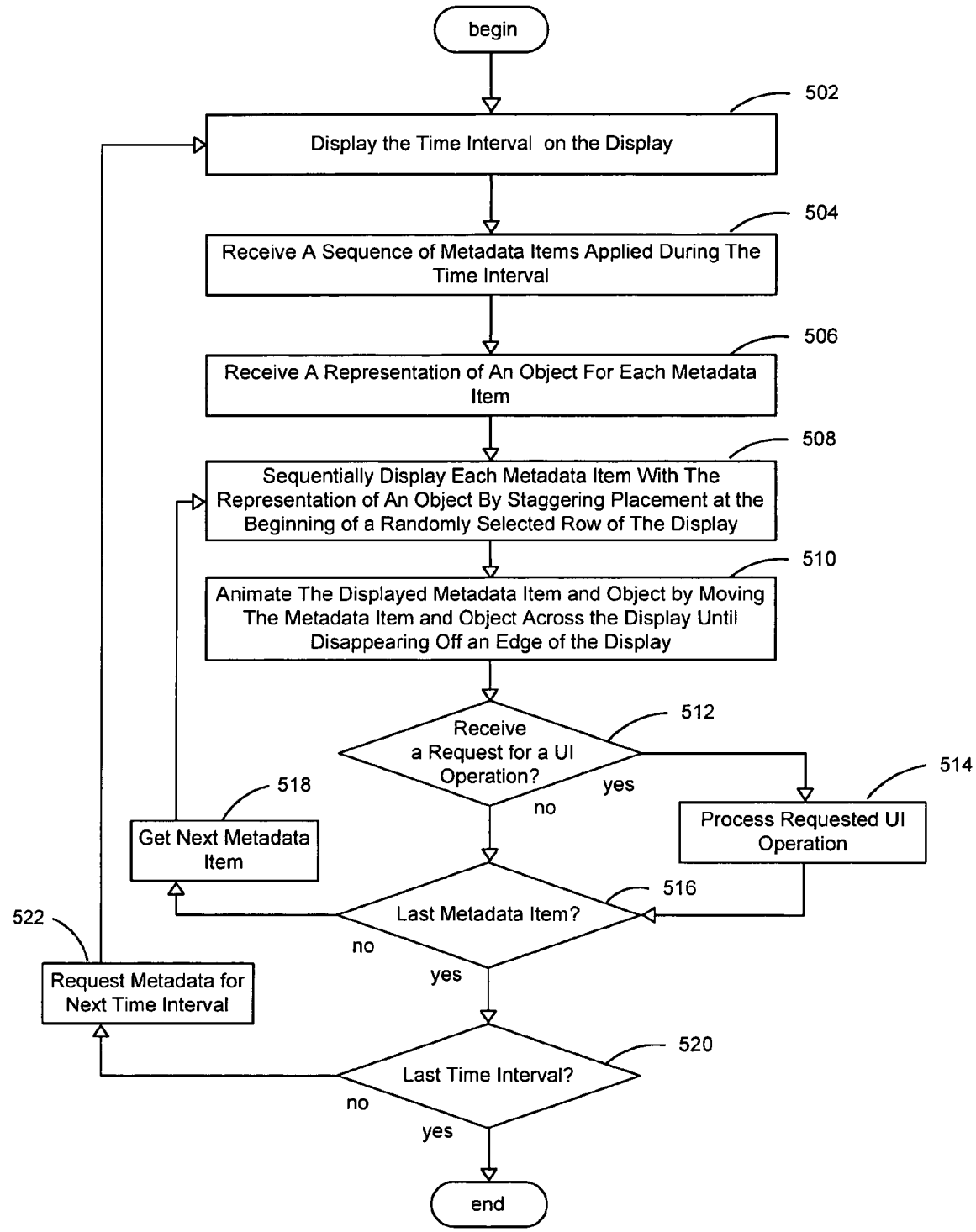
FIG. 5 is a flowchart generally representing the steps undertaken in one embodiment for visualization of the evolution of object metadata flowing like a river over time, in accordance with an aspect of the present invention.

FIG. 5 presents a flowchart generally representing the steps undertaken in one embodiment for visualization of the evolution of object metadata flowing like a river over time. For example, a web browser executing on a client computer may request visualization of the evolution of metadata describing objects in an object store, such as tags annotating photographs shared online. At step 502, a time interval may be displayed on a display. In an embodiment, the time interval may be displayed within a timescale bar that may represent several time intervals. A sequence of metadata items applied during the time interval may be received at step 504. In response to a request from a client computer in an embodiment, a server may send a ranked list of metadata items applied during the time interval. At step 506, a representation of an object for each metadata item may be received. In various embodiments, the representation of the object may also be received with each metadata item.

Once each metadata item and object may be received, each of the metadata items may be sequentially displayed with the representation of an object at step 508 by staggering placement of each of the metadata items at the beginning of a randomly selected row of the display along with the representation of the object for the metadata item. Each displayed metadata item and object may be animated upon placement into a randomly selected row of a display at step 510 by being moved across the display until disappearing off the edge of the display. In this way, each metadata item of a ranked list and its associated object may be animated to move across random rows of the display to effect a visualization of the metadata and object for a time interval to flow like a river across the display. In various embodiments, the intensity of the typeface of the text of the metadata item may be set to be proportional to the rank of the metadata item in the rank list.

Figure 6:
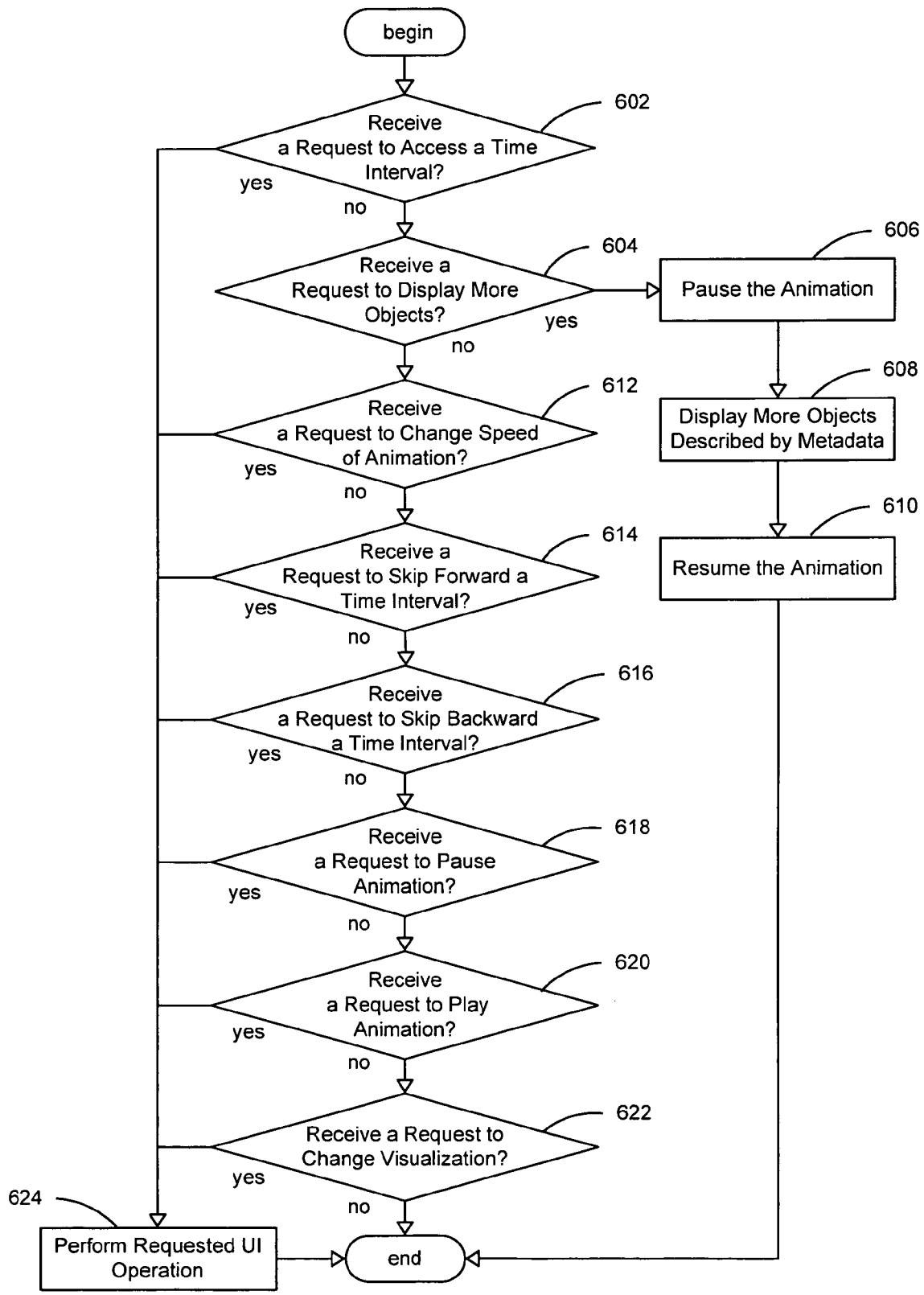
FIG. 6 is a flowchart generally representing the steps undertaken in one embodiment for processing a request to perform a user interface operation for interacting with the visualization of the evolution of object metadata over time, in accordance with an aspect of the present invention.

While the displayed metadata items and associated objects may be animated to move across the display, it may be determined at step 512 whether a request for a user interface operation may be received. If so, the requested operation may be performed at step 514. FIG. 6 describes in more detail processing requested user interface operations. Otherwise, it may then be determined at step 516 whether the last metadata item in the sequence of received metadata items may have been displayed. If it may be determined that the last metadata item in the sequence of received metadata items may have not been displayed, then the next metadata item may be obtained at step 518 and processing may proceed at step 508. Otherwise, it may then be determined at step 520 whether the last time interval in the timescale may have been processed. If not, then metadata for the next time interval may be requested at step 522 and processing proceeds at step 502. If the last time interval in the timescale may have been processed, then processing may be finished for visualization of the evolution of object metadata flowing like a river.

FIG. 6 presents a flowchart generally representing the steps undertaken in one embodiment for processing a request to perform a user interface operation for interacting with the visualization of the evolution of object metadata over time. At step 602, it may be determined whether the request received for processing a user interface operation for interacting with the visualization of the evolution of object metadata may be a request to access a time interval. In an embodiment, a user may make a request to randomly access a time interval by dragging a pointer displayed in a timescale bar on a display in either direction to a desired time interval. If so, the requested user interface operation may be performed at step 624 by requesting metadata for the indicated time interval.

If the request received may not be a request to access a time interval, then it may be determined at step 604 whether the request may be to display more objects. In an embodiment, a user may make a request to display more objects by selecting a metadata item with an input device. If so, the animation of the visualization may be paused at step 606 and more objects described by the metadata item may be displayed at step 608. In an embodiment, one or more objects may be displayed in the same row along side other displayed objects described by the metadata item. After displaying more objects at step 608, the animation of the visualization may be resumed at step 610 and processing may be finished for receiving a request to display more objects.

If the request received may not be a request to display more objects, then it may be determined at step 612 whether the request may be to change speed of the animation. In an embodiment, a user may make a request to change speed of the animation by selecting with an input device a control for changing speed. If so, the requested user interface operation may be performed at step 624 by changing the speed of the animation.

If the request received may not be a request to change speed of the animation, then it may be determined at step 614 whether the request may be to skip forward a time interval. In an embodiment, a user may make a request to skip forward a time interval by selecting with an input device a control for skipping forward. If so, the requested user interface operation may be performed at step 624 by skipping forward a time interval.

If the request received may not be a request to skip forward a time interval, then it may be determined at step 616 whether the request may be to skip backward a time interval. In an embodiment, a user may make a request to skip backward a time interval by selecting with an input device a control for skipping backward. If so, the requested user interface operation may be performed at step 624 by skipping backward a time interval.

If the request received may not be a request to skip backward a time interval, then it may be determined at step 618 whether the request may be to pause the animation. In an embodiment, a user may make a request to pause the animation by selecting with an input device a control for pausing the animation. If so, the requested user interface operation may be performed at step 624 by pausing the animation.

If the request received may not be a request to pause the animation, then it may be determined at step 620 whether the request may be to play the animation. In an embodiment, a user may make a request to play the animation by selecting with an input device a control for playing the animation. If so, the requested user interface operation may be performed at step 624 by playing the animation.

If the request received may not be a request to play the animation, then it may be determined at step 622 whether the request may be to change the visualization. In an embodiment, there may be separate controls to seamlessly switch between the river visualization and the waterfall visualization. If so, the requested user interface operation may be performed at step 624 by changing the visualization. After changing the visualization, processing may be finished for performing a user interface operation requested for interacting with the visualization of the temporal evolution of object metadata.

Figure 7:
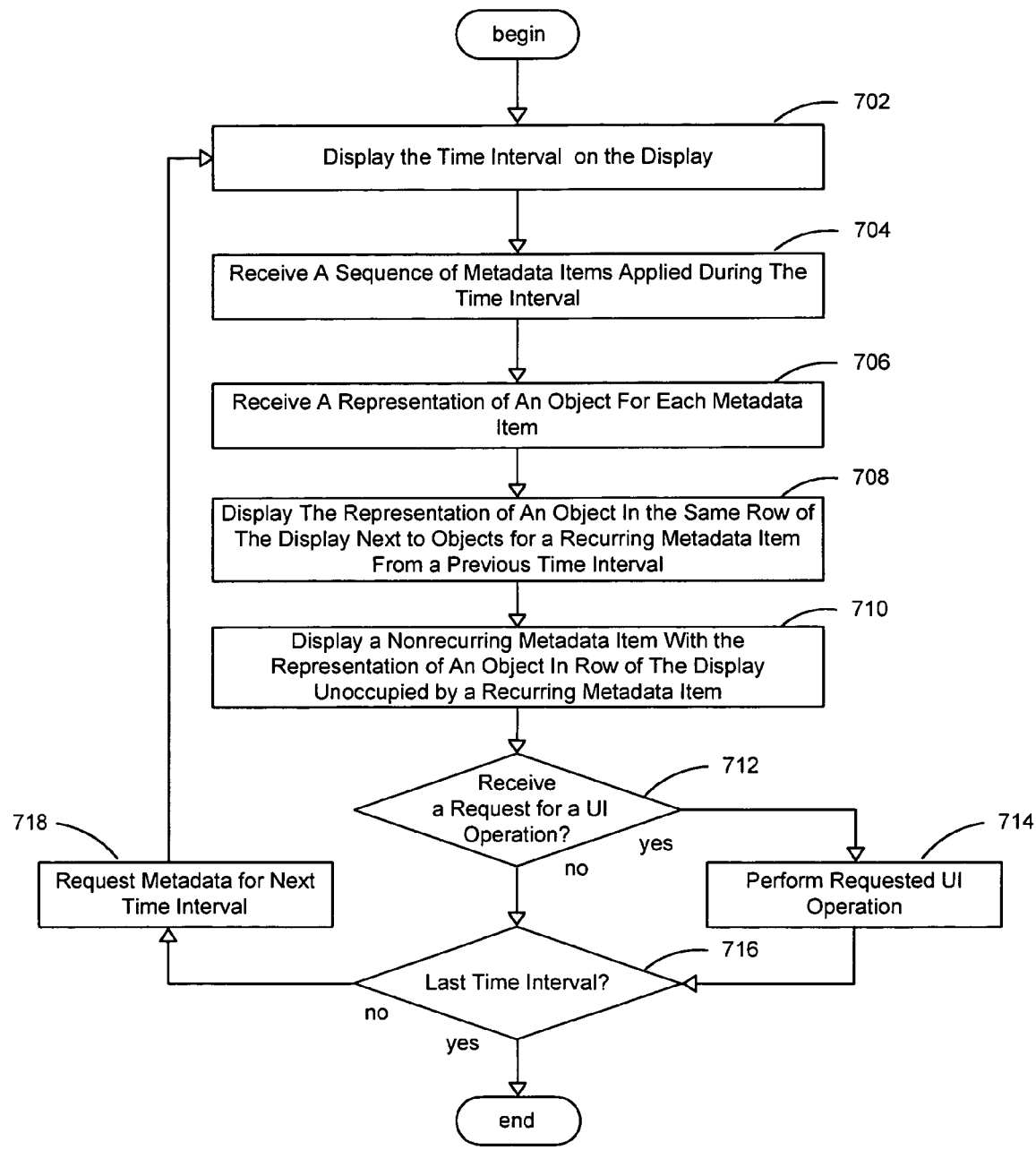
FIG. 7 is a flowchart generally representing the steps undertaken in one embodiment for visualization of the evolution of metadata describing objects cascading like a waterfall over time, in accordance with an aspect of the present invention.

FIG. 7 presents a flowchart generally representing the steps undertaken in one embodiment for visualization of the evolution of metadata describing objects cascading like a waterfall over time. An application, like a web browser executing on a client computer, may request visualization of the evolution of metadata describing objects in an object store, such as tags annotating photographs shared online. At step 702, a time interval may be displayed on a display. In an embodiment, the time interval may be displayed within a timescale bar that may represent several time intervals. A sequence of metadata items applied during the time interval may be received at step 704. In response to a request from a client computer in an embodiment, a server may send a ranked list of metadata items applied during the time interval. At step 706, a representation of an object for each metadata item may be received. In various embodiments, the representation of the object may also be received with each metadata item.

Once each metadata item and object may be received, any metadata item recurring from the previous time interval may continue to be displayed in the same row where it was displayed in the previous time interval and the metadata item may have the representation of its associated object displayed in the same row of the display next to one or more objects displayed from the previous time interval for that metadata item at step 708. Any metadata items received that may be nonrecurring from the previous time interval may be placed and displayed at step 710 along with the representation of its object in a row of the display that may be unoccupied by a metadata item recurring from the previous time interval. In various embodiments, the intensity of the typeface of the text of the metadata item may be set to be proportional to the rank of the metadata item in the rank list.

While metadata items and associated objects may be displayed for a time interval of the timescale, it may be determined at step 712 whether a request for a user interface operation may be received. If so, the requested operation may be performed at step 714. FIG. 6 describes in more detail processing requested user interface operations. Otherwise, it may then be determined at step 716 whether the last time interval in the timescale may have been processed. If not, then metadata for the next time interval may be requested at step 718 and processing proceeds at step 702. If the last time interval in the timescale may have been processed, then processing may be finished for the visualization of the evolution of metadata describing objects cascading like a waterfall over time.

Those skilled in the art will appreciate that the visualizations described may depict the temporal evolution of metadata for any specified timescale, including a day, a week, a month, and so forth. For example, a timescale may be a number w representing the width in days of the interval of time that will be considered at each timestep. Given an interval width w and a particular timestep t, a ranked list of metadata items that may occur from t to t+w may be provided for visualization. More generally, a ranked list of metadata may be provided for a collection of timestamped metadata and a query interval [a,b]. In an embodiment, the actual interval may be considered right-open, [a,b), to avoid double counting the endpoints.

Figure 8:
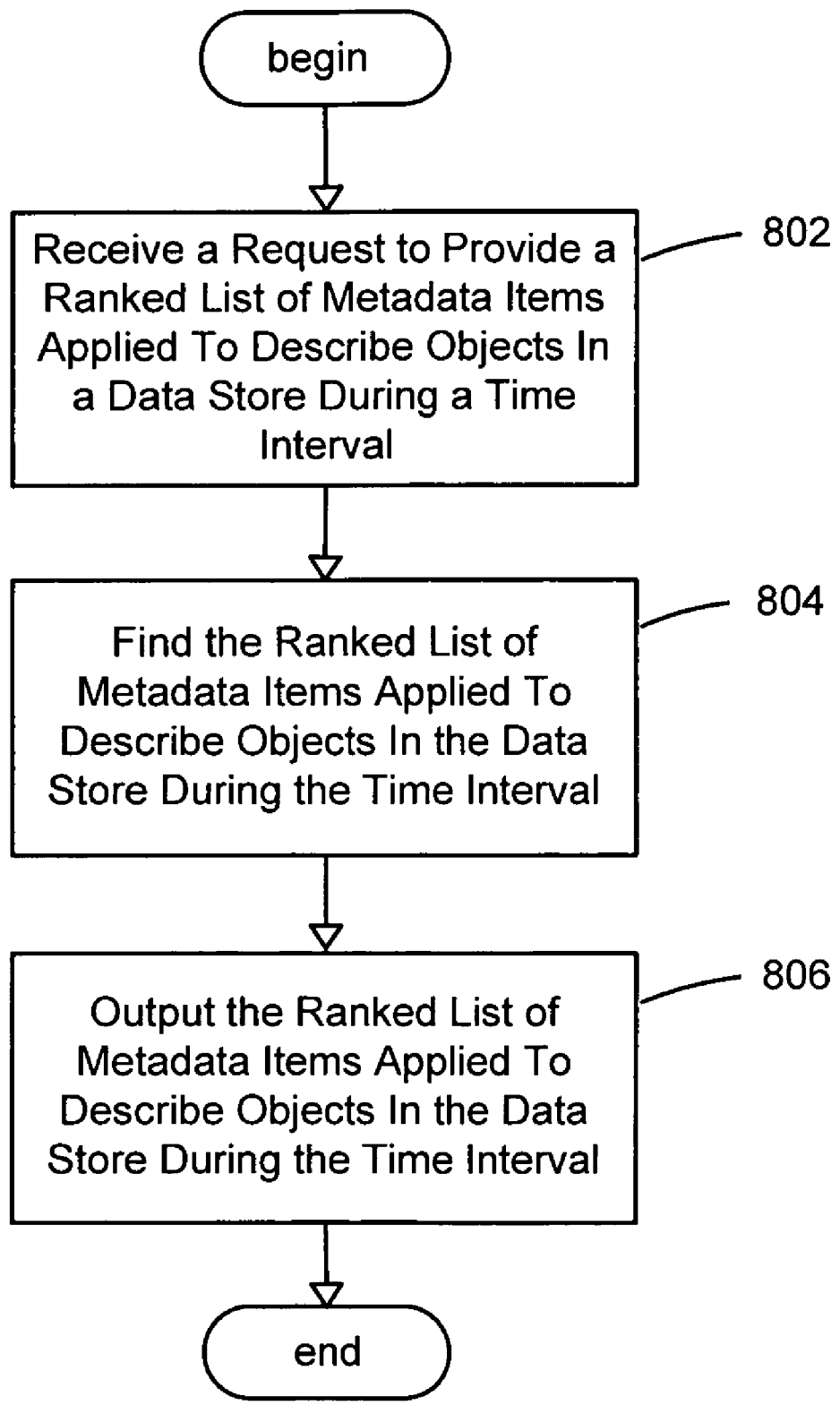
FIG. 8 is a flowchart generally representing the steps undertaken in an embodiment for providing a ranked list of metadata items describing objects for a time interval, in accordance with an aspect of the present invention.

FIG. 8 presents a flowchart generally representing the steps undertaken in an embodiment for providing a ranked list of metadata items describing objects for a time interval. At step 802, a request to provide a ranked list of metadata items applied to describe objects in a data store during a time interval may be received. To do so, a ranked list of metadata items applied to describe objects in a data store during a time interval may be found at step 804. Once found, the ranked list of metadata items applied to describe objects in a data store during a time interval may be output at step 806. In an embodiment of a client and server, a server, for instance, may receive a request from the client to provide a ranked list of metadata items applied to describe objects during a time interval so that the client may consume the output provided by the server in order to generate a visualization of the temporal evolution of the metadata. The ranked list of metadata items may also include a representation of an object for each metadata item in the ranked list so the representation of the object may be displayed as part of the visualization.

In various embodiments, metadata items occurring during a query interval may be ranked according to their popularity in the collection of timestamped metadata. For instance, consider 0, . . . , T−1 to be discrete points in time representing timestamps and consider U={$u_1$, . . . ,} to be the universe of metadata items in an embodiment. A metadata item u∈U may have a multiset of timestamps associated with it, indicating its occurrence over time. Because the occurrences may be a multiset, a metadata item may occur many times during the same timestep. Consider γ(u,t) to denote the number of times the metadata item u occurs at time t and $$\gamma(u) = \sum_{t=0}^{T-1} \gamma(u, t)$$

to denote the total number of occurrences of metadata item u. A measure of popularity may then be defined to include the following properties: (1) a metadata item may be considered popular during a particular interval if it may occur more frequently within the interval, and less frequently outside the interval; (2) a highly infrequent metadata item that may happen to occur only during a particular time interval may not necessarily be a popular metadata item for that time interval.

Consider I=[a,b) to be a time interval, where $0 \leq a < b \leq T$. In order to introduce a measure to meet the tradeoffs implied by the two properties above, the measure may include the probability that a particular metadata item may occur within I to satisfy both aspects of the first property above, and the measure may include a regularization constant C, a positive integer, to satisfy the second property above. Thus for any metadata item u and interval I, a measure of the popularity of u during I may be measured by:

$$P(u, I) = \sum_{t \in I} \gamma(u, t) / (C + \gamma(u)).$$

This measure may capture popular metadata items that may not necessarily be the most frequent metadata items that occur in interval I. The parameter C ensures that metadata items objects that may occur only in I but very few number of times may not necessarily be considered a popular metadata item for that time interval. Finally, the popular metadata items for 1 may be those with the highest values of P(.,I), with the actual value measuring the "intensity" of the popularity. Note that this measure of popularity may be linear: if $I_1$ and $I_2$ may be disjoint intervals, then $P(u,I_1 \cup I_2)=P(u,I_1)+P(u,I_2)$ and if $I_1 \subseteq I_2$, then $P(u,I_1 \backslash I_2)=P(u,I_1)-P(u,I_2)$. As we will see, this linearity property advantageously permits development of efficient algorithms for computing popularity for arbitrary intervals, after moderate amounts of preprocessing. Those skilled in the art will appreciate that other linear measures may be used to rank metadata items occurring in the collection of metadata items as well as for particular time interval.

Figure 9:
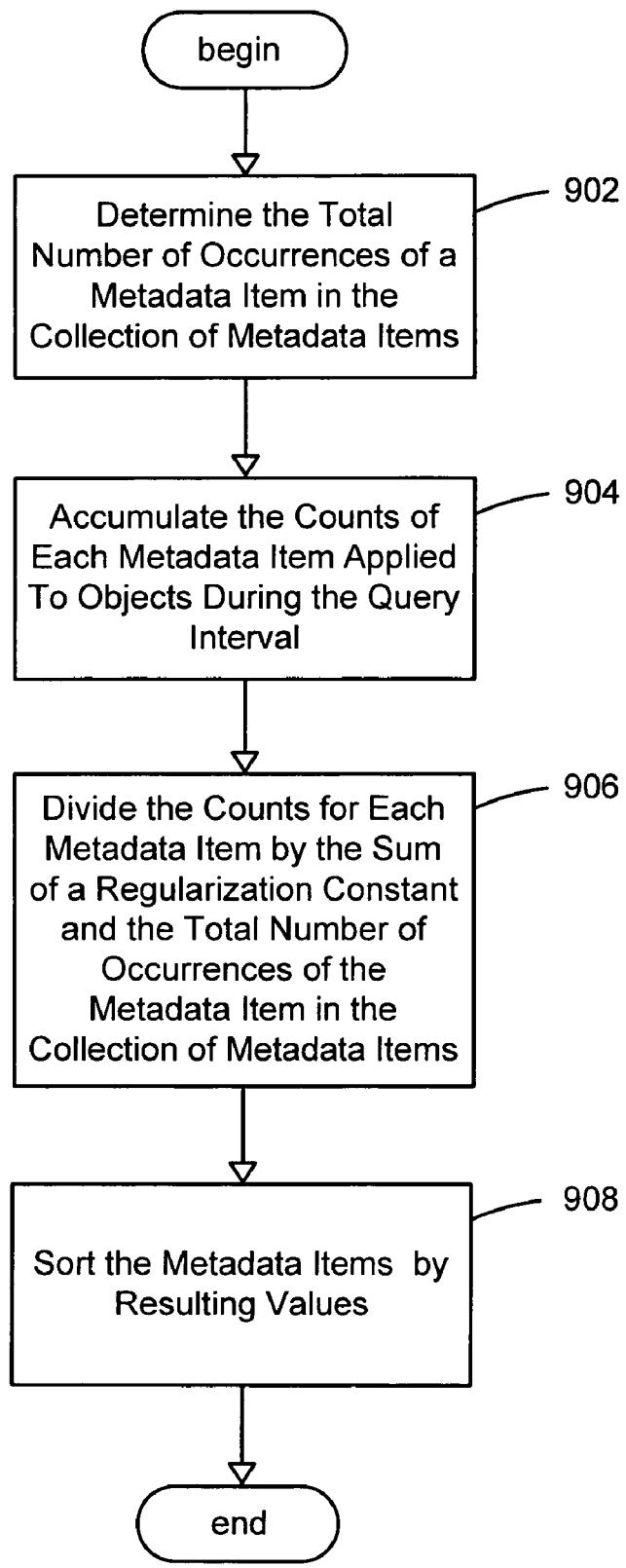
FIG. 9 is a flowchart generally representing the steps undertaken in one embodiment for determining a ranked list of metadata items for a query interval, in accordance with an aspect of the present invention.

FIG. 9 presents a flowchart generally representing the steps undertaken in one embodiment for determining a ranked list of metadata items for a query interval. At step 902, determine the total number of occurrences of a metadata item in the collection of metadata items. In an embodiment, $$\gamma(u) = \sum_{t=0}^{T-1} \gamma(u, t)$$

may be precomputed for each metadata item u. Then counts of each metadata item applied to objects for a query interval may be accumulated at step 904. Then, at step 906, the resulting counts of each metadata item may be divided by the sum of a regularization constant and the total number of occurrences of the metadata item in the collection. The metadata items may be sorted by resulting values at step 908 to provide a ranked list. Although functional, this method may be too slow for real-time applications with large data sets and/or long timescales.

Figure 10:
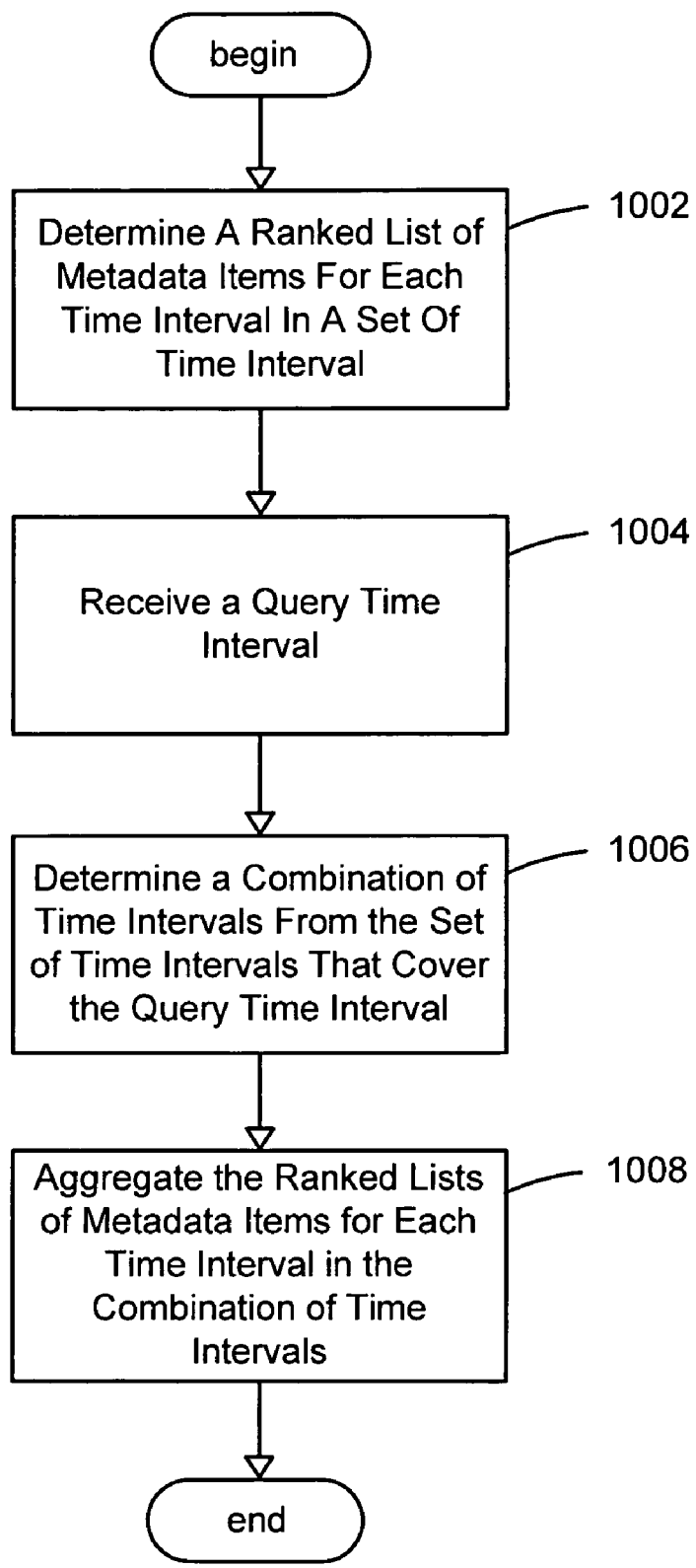
FIG. 10 is a flowchart generally representing the steps undertaken in one embodiment for providing a ranked list of metadata items describing objects for a time interval using a set of pre-chosen intervals and aggregating pre-computed information, in accordance with an aspect of the present invention.

The method discussed above may be modified to run faster for finding a ranked list of metadata items that occur during a query interval. Such modification may include a pre-processing step that may pre-compute popularity of some or all metadata items for some carefully chosen intervals and a real-time step that may aggregate some of this pre-computed information to determine a ranked list of popular metadata items at runtime. FIG. 10 presents a flowchart generally representing the steps undertaken in one embodiment for providing a ranked list of metadata items describing objects for a time interval using a set of pre-chosen intervals and aggregating pre-computed information. At step 1002, a ranked list of metadata items for each time interval in a set of pre-chosen time intervals may be determined. In various embodiments, the counts of all metadata items may be pre-computed within a chosen set of intervals at various different scales. For each power of two, say $2^i$, with $i=1, \ldots, \lg T$, all the days with intervals of length $2^i$ may be covered and for each such interval a list of all metadata items that occur during the interval may be pre-computed, sorted by popularity. For example, at length scale $2^3=8$, intervals [0,8), [8,16), [16, 24), [24,32), . . . , may be chosen and a ranked list of popular metadata items occurring during each of these interval may be pre-computed. Similarly, a sorted list of all metadata items may be pre-computed that occur during intervals for all length scales that may be powers of 2 between 1 and lg T. For simplicity, it is assumed that T may be a power of 2. Because there may be fewer and fewer intervals at each increasing length scale, the total storage for all these pre-chosen time intervals may only double the original data representation, and may advantageously reside on disk during processing.

After determining a ranked list of metadata items for each interval in a set of pre-chosen intervals, a query time interval may be received at step 1004. Upon receiving a query time interval, a combination of time intervals may be determined at step 1006 from the set of pre-chosen time intervals that may cover the query time interval. Thus, in order to perform a query for a particular interval I=[t,t+w), the interval I may be expressed as a combination of some of the pre-chosen intervals for which a sorted list of popular metadata items may be pre-computed. In one embodiment, a combination of time intervals may be determined by expressing an interval I as a disjoint union of time intervals from the set of pre-chosen time intervals. In another embodiment, a combination of time intervals may be determined by expressing an interval I as both a union and difference of time intervals from the set of pre-chosen time intervals.

After determining a combination of pre-chosen time intervals that may cover the query time interval, the pre-computed ranked lists of metadata items may be aggregated at step 1008 for each time interval in the combination of pre-chosen time intervals. In this way, the top k popular metadata items for the query interval I may be found at run-time and may then be returned for use by an application such as a web browser for rendering in a visualization of the temporal evolution of metadata items.

As noted above, in one embodiment, a combination of time intervals may be determined by expressing an interval I as a disjoint union of time intervals from the set of pre-chosen time intervals. For example, given an arbitrary interval I=[a, b), the largest interval, I'=[a',b'), may be identified in the pre-chosen set of time intervals that may be completely contained in I, such that I'⊆I. This may be done very efficiently by examining b−a and a. This pre-chosen interval may be added to the collection, and then the process may recurse on the subintervals [a, a'] and [b', b] as long as they are non-empty. This method may accordingly output an optimal decomposition of I using unions of pre-chosen intervals.

After determining a combination of pre-chosen time intervals as a disjoint union of time intervals from the set of pre-chosen time intervals, the pre-computed ranked lists of metadata items may be aggregated for each time interval in this embodiment by employing the Threshold Algorithm (TA) of Fagin, Lotem and Naor. (See *Optimal Aggregation Algorithms for Middleware* by R. Fagin, A. Lotem, and M. Naor in the Journal of Computer and System Sciences, 66(4): 614-656, 2003.) In general, the Threshold Algorithm may be applied where there may be a collection of metadata items, each of which has been scored on m separate dimensions. For each dimension, a list of metadata items may be available sorted in order of score for that dimension. A function f may combine the scores for each of the dimensions into a single overall score for the metadata item. Accordingly, each of the m sorted lists of metadata items may be access in parallel, in any order. For each metadata item, its score may be retrieved from all m dimensions, and its overall score may be computed using f. The score function f is assumed to be monotone: if one metadata item scores at least as high as another in every dimension, it cannot be ranked lower overall. Let $x_i$ be the score in the $i^{th}$ dimension of the last metadata item seen in the $i^{th}$ list. Considering $\tau = f(x_1, \ldots, x_m)$, once k metadata items have been seen whose overall score is at least $\tau$, the process may terminate and return the k top metadata items seen so far.

Thus, for a query interval I, I may be represented as a union of intervals $I=I_1 \cup \ldots \cup I_l$. For each metadata item u, the score for each interval $I_j$ is simply $P(u, I_j)$. Due to the linearity of P, these scores may be combined by simple addition, which is a monotone combination of the scores from each interval. Thus, the Threshold Algorithm may be applied to find the top k elements for a query time interval represented as a disjoint union of pre-chosen time intervals having a ranked list of metadata items computed for each time interval.

In another embodiment, a combination of time intervals may be determined by expressing an interval I as both a union and difference of time intervals from the set of pre-chosen time intervals. This may result in a more succinct representation that may be a more efficient computation at run-time. However, the aggregation algorithm to find the top k metadata items of I may become more complex.

For instance, consider that I=[0,63), then expressing I as a union of pre-chosen intervals may result in representing I as I=[0,32)∪[32,48)∪[48, 56)∪[56, 60)∪[60, 62)∪[62,63). On the other hand, a more succinct expression of I is possible if set differences may be used to represent I as both a union and difference of time intervals such as I=[0,64)\[63,64).

Furthermore, if the query interval I is of the form [0,B] where the left endpoint is zero, this case may be recast as the following simple problem: given an integer B, express it as sums and differences of powers of 2 in the shortest possible way. Such a query interval may be covered using one of two options. In the first option, the largest pre-computed interval contained entirely within I may be chosen, and then the remainder of I may be recursively covered by choosing the largest pre-computed interval contained entirely within the remainder of I. In the second option, the smallest pre-computed interval that completely covers I may be chosen, and then the remainder interval between I and the covering interval may be recursively covered by choosing the smallest pre-computed interval that completely covers the remainder interval and subtracting the difference between the covering pre-computed interval and the remainder interval.

Thus the query interval may be covered using the option which may minimize the length of the remainder interval. This method may be defined in terms of the right endpoint B, where b may be the number of bits needed to represent B, as follows:

if $B > 3 \cdot 2^{b-2}$, then $\rho(B) = 2^b - \rho(2^b - B)$; If $B \leq 3 \cdot 2^{b-2}$, then $\rho(B) = 2^b - \rho(2^b - B)$.

This method may optimally express a left-aligned interval in terms of unions and differences of pre-computed intervals, since every number B may be expressed as $$\sum_i p_i - \sum_i q_i$$

where $p_i$ and $q_i$ are powers of 2. This result may be extended to provide an optimal algorithm for covering a left-aligned interval I using unions and set differences even if the interval may be shifted by a large power of 2. Consider p(I) to denote an optimal representation for covering an arbitrary interval I using unions and set differences. Assuming $I=[2^a, 2^a+B]$, with $a \geq b$, and assuming the interval [0,B] may be optimally represented as $$\sum_i p_i - \sum_i q_i,$$

then p(I) may be defined as follows:

$$p(I) = \cup_i [2^a, 2^a + p_i] \setminus \cup_i [2^a + q_i].$$

In a straightforward manner, the method may also be extended to provide an optimal algorithm for covering a right-aligned interval $I=[2^a-B, 2^a]$, obtaining p(I) using p(B). Accordingly, a method may be constructed to provide an optimal algorithm for an arbitrary interval I=[a,b) into unions and set differences of pre-computed intervals.

There may be two options for representing I. First of all, the smallest power of two may be identified such that no pre-computed interval of that width may be contained in I. I may cover the right endpoint of exactly one interval of this length. Assume c to be the location of that endpoint. Similarly, some pre-computed interval of twice that length may cover I. Assume J=[a',b') may be that interval. If x may be the number of bits needed to represent the length of I, then note that a', b', c may all be multiples of powers of 2 greater than or equal to $x^2$.

For the first of two options for optimally representing I, consider covering I using the intervals [a,c) and [c,b) both of which may be shifted left-aligned intervals by our earlier observation, and may therefore be covered optimally using the technique above. For the second of two option for optimally representing I, begin by taking J, and then remove [a', a) and [b',b), both of which are also left-aligned intervals and hence amenable to the technique above. These two possible solutions may be compared, and the result which minimizes the length of the remainder interval may be chosen. Using this method, an optimal combination of pre-computed time intervals may be determined by expressing an interval I as both a union and difference of time intervals from the set of pre-chosen time intervals.

Notice that the aggregation function may be given by the actual decomposition: if $I=(\cup_{J \in T_+} J) \setminus (\cup_{J \in T_-} J)$, then $$P(u, I) = \sum_{J \in T_+} P(u, J) - \sum_{J \in T_-} P(u, J).$$

Therefore, the aggregation function f may no longer be monotone, a prerequisite for using the Threshold Algorithm. However, also notice that f may be of a very special form: $f=f_+ - f_-$ where $f_+$ and $f_-$ are monotone. As a result, there may be two options based the kind of access model that is available to find the k metadata items with the highest f scores. The first method may work when the access may be available to metadata items sorted by their $f_+$ and $f_-$ scores. For instance, this may be the case if the Threshold Algorithm may be used to find the metadata items with the highest/lowest $f_+$ and $f_-$ scores. The metadata items ordered by $f_+$ and the metadata items ordered by $f_-$ may be accessed in parallel until the same k metadata items have been accessed in both lists. These k metadata items with top aggregated scores may then be output.

The second, more efficient method may be used if, in addition to sorted access, there may be random access the $f_+$ or $f_-$ score of a metadata item. The metadata items ordered by decreasing values of $f_+$ and the metadata items ordered by increasing values of $f_-$ may be accessed in parallel. As a metadata item may be seen under sorted access in one of the lists, the other list may be randomly accessed to find its score. For $f_+$, $f_-$, consider $x_+$, $x_-$ to be the score of the last metadata item seen under sorted access. As soon as at least k objects may be been seen whose aggregate score may be at least $\tau$, where $\tau$ may be defined as $\tau = x_+ - x_-$, then the k objects with top aggregated scores may be output.

Thus the present invention may flexibly summarize and depict the temporal evolution of metadata describing objects in the object store over a plurality of time intervals. A user may observe and interact with the visualizations as they present salient metadata associated with a sliding interval of time. For instance, a user may randomly accessing a time interval, change the speed of the animation, and/or switch between visualizations. Those skilled in the art will appreciate that other controls and implementations for selection or presentation of salient metadata may be employed. For example, the query time interval may be implemented as an incrementally sliding interval that may produce coverage that changes on average by a small number of members.

As can be seen from the foregoing detailed description, the present invention provides an improved system and method for selecting and visualizing object metadata evolving over time. The system and method may apply broadly to materializing and visualizing sequences of summarized data points along a time series for any type of content including audio, image, and video. Such a system and method may efficiently summarize metadata belonging to large datasets and occurring over long timescales. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for selecting object metadata, comprising:
   at least one processor;
   a ranking analysis engine that selects and orders into a ranked list metadata describing objects in an object store for each time interval in a set of time intervals, wherein each of the objects is text, audio, image, multimedia content, and mixtures thereof;

an interval covering engine configured with the ranking analysis engine that determines a combination of time intervals from the set of time intervals that cover a query time interval; and an aggregation engine configured with the interval covering engine that aggregates a plurality of ranked lists of metadata for each time interval in the combination of time intervals that cover the query time interval.

2. The system of claim 1 further comprising a server query handler configured with the interval covering engine that receives a request from a client to obtain metadata describing objects in the object store for at least one time interval.

3. The system of claim 2 further comprising a visualization engine configured with the client that generates a visualization in a user interface depicting temporal evolution of the metadata describing objects in the object store over a plurality of time intervals.

4. The system of claim 3 further comprising an application configured with the visualization engine that requests generation of the visualization in the user interface depicting the temporal evolution of the metadata describing objects in the object store over the plurality of time intervals.

5. A computer-readable storage medium having computer-executable components comprising the system of claim 1.

6. A computer system for selecting object metadata in a computer system, comprising:

means for receiving, by at least one processor, a request to provide a ranked list of metadata items applied to describe objects for a query time interval, wherein each of the objects is text, audio, image, multimedia content, and mixtures thereof;

means for determining a combination of time intervals from a set of time intervals that cover the query time interval;

means for aggregating a plurality of ranked lists of metadata items for each time interval in the combination of time intervals that cover the query time interval; and means for outputting a result of aggregating the ranked lists.

7. The system of claim 6 further comprising means for determining the ranked list of metadata items applied to describe objects for each time interval in the set of time intervals.

8. The system of claim 6 further comprising means for choosing the set of time intervals whereby each time interval in the set may have a timestep of a different width than a timestep of another time interval in the set.

9. The system of claim 6 wherein means for aggregating ranked lists of metadata items for each time interval in the combination of time intervals that cover the query time interval comprises:

means for retrieving a score for a metadata item from each ranked list having a score for the metadata item; and means for combining each retrieved score for the metadata item into an overall score for the metadata item.

10. A computer-implemented method for selecting object metadata in a computer system, comprising:

determining a ranked list of metadata items applied to describe objects for each time interval in a set of time intervals, wherein each of the objects is text, audio, image, multimedia content, and mixtures thereof;

receiving a request to provide at least one metadata item applied to describe objects for a query time interval;

determining a combination of time intervals from the set of time intervals that cover the query time interval; and aggregating a plurality of ranked lists of metadata items for each time interval in the combination of time intervals that cover the query time interval.

11. The method of claim 10 wherein determining the ranked list of metadata items applied to describe objects for each time interval in the set of time intervals comprises accumulating counts of each metadata item applied to objects for each time interval in the set of time intervals and dividing the counts for each metadata item in each time interval by a sum of a regularization constant and a total number of occurrences of the metadata item in a collection of the metadata items.

12. The method of claim 10 wherein determining the ranked list of metadata items applied to describe objects for each time interval in the set of time intervals comprises choosing the set of time intervals whereby each time interval in the set may have a timestep of a different width than a timestep of another time interval in the set.

13. The method of claim 12 wherein a plurality of timesteps of a plurality of time intervals in the set of time intervals comprises a width equal to a power of two.

14. The method of claim 10 wherein determining the combination of time intervals from the set of time intervals that cover the query time interval comprises determining the combination of time intervals by finding a disjoint union of time intervals from the set of time intervals equivalent to the query time interval.

15. The method of claim 10 wherein determining the combination of time intervals from the set of time intervals that cover the query time interval comprises determining the combination of time intervals by finding a union and set difference of time intervals from the set of time intervals equivalent to the query time interval.

16. The method of claim 10 wherein determining the combination of time intervals from the set of time intervals that cover the query time interval comprises:

finding a disjoint union of time intervals from the set of time intervals equivalent to the query time interval;

finding a union and set difference of time intervals from the set of time intervals equivalent to the query time interval; and choosing a combination of the disjoint union of time intervals if a number of time intervals in an expression of a sum of time intervals of the combination of the disjoint union of time intervals is less than a number of time intervals in an expression of the union and set difference of time intervals of a combination of the union and set difference of time intervals.

17. The method of claim 10 wherein aggregating the plurality of ranked lists of metadata items for each time interval in the combination of time intervals that cover the query time interval comprises:

accessing the ranked list of metadata items for each time interval in the combination of time intervals;

retrieving a score for a metadata item from each ranked list having a score for the metadata item; and combining each retrieved score for the metadata item into an overall score for the metadata item.

18. The method of claim 10 wherein aggregating the plurality of ranked lists of metadata items for each time interval in the combination of time intervals that cover the query time interval comprises:

accessing a first ranked list of metadata items sorted by results of a first function for combining scores retrieved from the combination of time intervals for each metadata item into an overall score for the metadata item;

accessing a second ranked list of metadata items sorted by results of a second function for combining scores retrieved from the combination of time intervals for each metadata item into an overall score for the metadata item;

finding an identical list of a plurality of metadata items from the first ranked list sorted by the results of the first function and from the second ranked list sorted by the results of the second function; and generating a list of metadata items in the order of finding each of the metadata items in the identical list of the plurality of metadata items from the first ranked list sorted by the results of the first function and the second ranked list sorted by the results of the second function.

19. The method of claim 10 wherein aggregating the plurality of ranked lists of metadata items for each time interval in the combination of time intervals that cover the query time interval comprises:

accessing a first ranked list of metadata items sorted by decreasing value of results of a first function for combining scores retrieved from the combination of time intervals for each metadata item into an overall score for the metadata item;

accessing a second ranked list of metadata items sorted by increasing value of results of a second function for combining scores retrieved from the combination of time intervals for each metadata item into an overall score for the metadata item;

finding metadata items from the first ranked list of metadata items sorted by decreasing value of results of the first function in the second ranked list of metadata items sorted by increasing value of results of the second function; and generating a list of the metadata items in the order of increasing value of a score for each metadata item calculated as a sum of the overall score for each metadata item retrieved from the first ranked list of metadata items sorted by decreasing value of results of the first function and the overall score retrieved from the second ranked list of metadata items sorted by increasing value of results of the second function.

20. A computer-readable storage medium having computer-executable instructions for performing the method of claim 10.

* * * * *